United States Patent
Overcash et al.

(10) Patent No.: US 12,301,438 B1
(45) Date of Patent: May 13, 2025

(54) IDENTIFYING AND MITIGATING SOURCES OF LAG IN A NETWORK

(71) Applicant: Cox Communications, Inc., Atlanta, GA (US)

(72) Inventors: Michael Paul Overcash, Duluth, GA (US); Stephen Alan Skinner, Jr., Atlanta, GA (US); David Adam Taylor, Flowery Branch, GA (US); Owen Thomas Parsons, Dunwoody, GA (US); Daniel Ray Sciscoe, Dunwoody, GA (US)

(73) Assignee: Cox Communications, Inc., Atlanta, GA (US)

( * ) Notice: Subject to any disclaimer, the term of this patent is extended or adjusted under 35 U.S.C. 154(b) by 0 days.

(21) Appl. No.: 17/880,395

(22) Filed: Aug. 3, 2022

(51) Int. Cl.
| | |
|---|---|
| *H04L 43/50* | (2022.01) |
| *H04L 43/08* | (2022.01) |
| *H04L 43/0829* | (2022.01) |
| *H04L 43/0864* | (2022.01) |
| *H04L 43/087* | (2022.01) |
| *H04L 43/12* | (2022.01) |

(52) U.S. Cl.
CPC .......... *H04L 43/50* (2013.01); *H04L 43/0829* (2013.01); *H04L 43/0864* (2013.01); *H04L 43/087* (2013.01); *H04L 43/12* (2013.01)

(58) Field of Classification Search
CPC . H04L 43/50; H04L 43/0829; H04L 43/0864; H04L 43/087; H04L 43/12
See application file for complete search history.

(56) References Cited

U.S. PATENT DOCUMENTS

| | | | | |
|---|---|---|---|---|
| 2017/0250887 | A1* | 8/2017 | Sadana | H04L 41/046 |
| 2019/0230012 | A1* | 7/2019 | Azizullah | H04L 43/18 |
| 2020/0052981 | A1* | 2/2020 | Pandey | H04L 41/142 |
| 2020/0177498 | A1* | 6/2020 | Thomas | H04L 43/10 |
| 2021/0168068 | A1* | 6/2021 | Shenoy | H04L 43/08 |
| 2021/0234769 | A1* | 7/2021 | Ganapathi | H04L 43/062 |
| 2021/0243104 | A1* | 8/2021 | Parmer | H04L 41/0869 |
| 2021/0392112 | A1* | 12/2021 | Nagrockas | H04L 45/7453 |

(Continued)

OTHER PUBLICATIONS

Bjørn Ivar Teigen, Known Performance Issues Are Prevalent in Consumer WiFi Routers, 2021, URL retrieved via: https://ieeexplore.ieee.org/abstract/document/9615514 (Year: 2021).*

*Primary Examiner* — Schquita D Goodwin
(74) *Attorney, Agent, or Firm* — Merchant & Gould P.C.

(57) ABSTRACT

Aspects are described that utilize a distributed network of measurement points to detect sources of lag in a network, but are not so limited. Sources of lag can be detected at particular locations in a network or multiple networks using a plurality of distributed measurement points. Each measurement point can be configured to monitor network conditions at a particular network location using a measurement client to perform a network testing procedure with a measurement stream. Each measurement point can also include a measurement server configured to receive a measurement stream from at least one measurement client. A controller is configured to manage and control one or more of the plurality of measurement clients using a secure connection. Aspects are configured to detect one or more sources of lag of a distributed network of devices and/or cause procedures to be implemented to mitigate identified sources of lag.

20 Claims, 7 Drawing Sheets

(56) References Cited

U.S. PATENT DOCUMENTS

2022/0103369 A1* 3/2022 Adams .................. H04L 9/3234
2022/0150153 A1* 5/2022 Clancy ................ H04L 43/0852
2022/0417303 A1* 12/2022 Dawkins .................... H04L 65/75
2023/0029882 A1* 2/2023 Hooda ................ H04L 43/0858
2023/0034229 A1* 2/2023 Oliveira .................. H04L 43/08
2023/0319021 A1* 10/2023 Gunti .................. H04L 63/0435
                                                    713/171
2024/0338464 A1* 10/2024 Fenster .................... H04L 9/14

\* cited by examiner

IDENTIFYING AND MITIGATING SOURCES OF LAG IN A NETWORK

BACKGROUND

Networks, including those of Internet service providers (ISPs), include multiple types of networking devices distributed throughout various locations. Managing the large numbers and different types of network devices is a daunting task without even considering the many different types of devices used in home or business networks that an ISP has little control over or knowledge of. Accordingly, the technical problem of identifying and mitigating unacceptable or unsatisfactory network conditions in a network, such as sources of lag for example, is compounded by the diverse types of network architectures and corresponding device types used by consumers in home or business local area networks (LANs). Unsatisfactory network conditions result in processing and memory intensive applications or services exhibiting abnormal or unacceptable behavior, such as a lagging or glitching application, client, or service for example.

Lag may be described as an aggregation of different types of unsatisfactory network conditions, such as unacceptable amounts of latency, jitter, and/or packet loss. Historically, subscriber internet use was not particularly sensitive to lag as being dominated by Hypertext Transfer Protocol (HTTP) web browsing and streaming protocols to download video segments. Today, however, popular applications like real-time video conferencing and online gaming can be extremely lag sensitive. There currently are no technical solutions available that enable ISPs or other entities to effectively identify sources of lag in networks due in part to unwieldy network footprints having diverse types of networking devices that span large areas of real estate. A technical solution is needed to provide a platform to monitor and track lag over time throughout one or multiple networks.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Aspects of the present disclosure utilize a distributed network of measurement points to detect sources of lag in a network, but are not so limited. According to an aspect, sources of lag can be detected at particular locations in a network or multiple networks using a plurality of distributed measurement points. Each measurement point can be configured to monitor network conditions at a particular network location using a measurement client configured to perform a network testing procedure with a measurement stream to determine network conditions associated with the particular network location. Each measurement point can, additionally or alternatively, include a measurement server configured to receive a measurement stream from at least one measurement client as part of a network testing procedure.

A controller is configured to manage and control one or more of the plurality of measurement points using a secure connection including configuring measurement servers with any required parameters. According to one aspect, the controller is configured to: issue a command to one or more of a plurality of measurement clients to begin round trip testing and/or performance testing with at least one measurement server, receive measurement results from one or more of the plurality of measurement clients, and determine a source of lag in a network based on the measurement results associated with one or more of the plurality of measurement clients. As described herein, aspects are configured to detect one or more sources of lag of a distributed network of devices and/or cause procedures to be implemented to mitigate identified sources of lag. Other aspects are described herein.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the present disclosure.

BRIEF DESCRIPTION OF THE DRAWINGS

Further features, aspects, and advantages of the present disclosure will become better understood by reference to the following figures, wherein like reference numbers indicate like elements throughout the several views.

DETAILED DESCRIPTION

Aspects of the present disclosure utilize a distributed network of measurement points to detect sources of lag in a network, such as an access network for example, but are not so limited. According to an aspect, sources of lag can be detected at particular locations in a network or multiple networks using a plurality of distributed measurement points. Each measurement point can be configured to monitor network conditions at a particular network location using a measurement client configured to perform a network testing procedure with a measurement stream to determine network conditions associated with the particular network location. Each measurement point can, additionally or alternatively, include a measurement server configured to receive a measurement stream from at least one measurement client as part of a network testing procedure. For example, a measurement client sends test packets to a port of a measurement server, the measurement server adds a timestamp to each test packet and sends the timestamped packets back to the measurement client for use in providing measurement results.

A controller is configured to manage and control one or more of the plurality of measurement points that can include at least one of measurement clients and measurement servers using a secure connection. According to one aspect, the controller is configured to: issue a command to one or more of a plurality of measurement clients to begin round trip testing or performance testing with at least one measurement server, receive measurement results from one or more of the plurality of measurement clients, and determine a source of lag in a network based on the measurement results associated with one or more of the plurality of measurement clients. As described herein, aspects are configured to detect one or more sources of lag of a distributed network of devices and/or cause procedures to be implemented to mitigate identified sources of lag. Other aspects are described herein.

Figure 1:
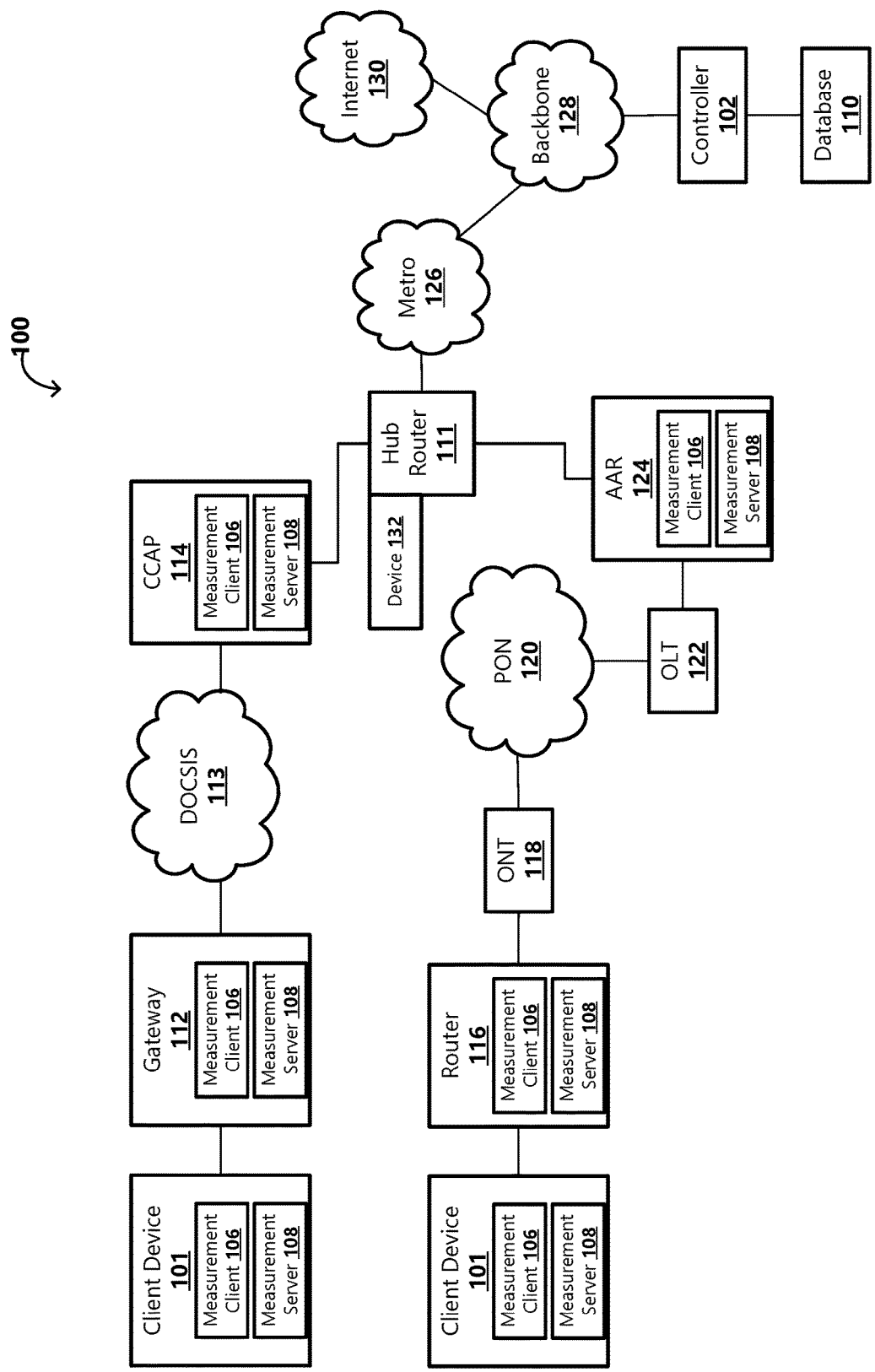
FIG. 1 is a block diagram of an example communication environment in which aspects of the present disclosure can be implemented.

FIG. 1 is a block diagram of an example communication environment 100 in which aspects of the present disclosure can be implemented. As shown in FIG. 1, environment 100 includes at least one controller 102 that is configured to manage and/or control a plurality of measurement points (also referred to as test points) distributed throughout environment 100, as described below. While one controller 102 is shown in FIG. 1, multiple controllers can be distributed throughout the environment 100 depending upon the number and types of network devices to be managed and/or controlled.

Measurement points can be included with devices on the subscriber side as well as devices on a service provider side and used to measure network conditions at certain points and/or at certain times within communication network, such as within an access network of a service provider for example. For example, measurement points can be included with Layer 3 type devices to detect network conditions and identify sources of lag, such as jitter sources, latency sources, packet loss sources, buffer bloat sources, etc. Each measurement point can be configured with at least one of a measurement client 106 and/or a measurement server 108. In some aspects, a network device may only include the measurement client 106 or measurement server 108, depending upon a preferred measurement configuration.

After registering with controller 102, when instructed by controller 102 to perform measurements, a measurement client 106 can be configured to transmit or send one or more measurement streams, such as streams of User Datagram Protocol (UDP) packets and/or Transmission Control Protocol (TCP) packets for example, to at least one measurement server 108 to detect sources of lag associated with portions of various network topologies that can include a variety of network and device types. As described below, a measurement stream can be configured to represent different types of communications, such as file downloads, video streaming, live video conferencing, online gaming, etc. Each measurement server 108 can be configured to receive one or more measurement streams that include configurable packet sizes, interpacket intervals, measurement durations, etc. from one or more measurement clients 106.

Database 110 can be configured to store network topologies including locations of measurement points, device types associated with each measurement point, measurement configurations and parameters including identification information that identifies each measurement client 106 and/or measurement server 108 associated with each measurement point, measurement initialization timing for subsets of measurement clients 106 and measurement servers 108, measurements durations, measurement results, alarms associated with measurement results including identified sources of lag, automated or manual remediation or mitigation procedures and/or results and resultant network settings or configurations, etc. Database 110 can include or couple to an inventory management database or system that identifies all know customer devices of an ISP or other network as well as network devices controlled by an ISP or other service provider. Database 110 can be updated in different ways and at different times, as described further below.

Controller 102 can be configured to control when and what type of network measurements are to be performed including which measurement client 106 and measurement server 108 combinations are to be used as part of a network condition determination. For example, and as described below with respect to FIGS. 3-6, controller 102 can be configured to manage different types of measurement tests, such as measurement tests involving one or more measurement clients 106 and/or one or more measurement servers 108 located with various network devices distributed throughout a network topology, network path monitoring, network buffer bloat monitoring, path-based measurement server discovery, etc.

According to an aspect, controller 102 can be configured to manage and control one or more of the plurality of measurement points using a secure connection, wherein the controller is configured to: issue a command to one or more of a plurality of measurement clients to begin round trip testing (e.g., Isochronous Round-Trip Tester (IRTT)) or performance testing with at least one measurement server, receive measurement results from one or more of the plurality of measurement clients, and determine a source of lag in a network based on the measurement results associated with one or more of the plurality of measurement clients. Sources of lag can include different types of unacceptable network conditions, such as unacceptable amounts of jitter, latency, packet loss, etc.

With continuing reference to FIG. 1, example communication environment illustrates two different network paths: a data over cable service interface specification (DOCSIS) network path and a passive optical network (PON) network path, each connecting to a hub router 111. It will be appreciated that environment 100 typically includes a large number of DOCSIS and PON network paths according to the number of customers or subscribers utilizing the respective types of equipment to access the internet or some other network. For this example, the DOCIS network path includes an integrated gateway 112 (e.g., Cox® Panoramic WIFI Gateway) that includes a wireless router and modem connected or coupled to DOCSIS network 113. While DOCSIS and PON network paths are described for this example, detecting sources of lag can be implemented in other network types, such as cellular, satellite, WI-FI, etc.

DOCSIS network 113 is connected or coupled to a converged cable access platform (CCAP) 114 (also referred to as a cable modem termination system (CMTS)) located at a headend location to provide services, including internet and cloud services, to consumer premise equipment (CPE) such as gateway 112 and consumer or client devices 101 connected to the gateway 112 over a hybrid fiber-coaxial (HFC) network. In some cases, a subscriber may have separate devices such as a modem device and a wireless router device coupled together via Ethernet cabling. CCAP 114 is connected or coupled to hub router 111. As shown, each component of the DOCSIS network path can include a measurement point that can include at least one of a measurement client 106 and/or a measurement server 108. For example, gateway 112 can include at least one of a measurement client 106 and/or a measurement server 108. For non-integrated devices, a subscriber router and modem may each include a measurement client 106 and/or a measurement server 108. Client devices 101, such as gaming platforms, laptops, tablets, smartphones, etc. can also include a measurement client 106 and/or a measurement server 108 to provide additional measurement granularity from these devices. While both of a measurement client 106 and a measurement server 108 are shown in FIG. 1, it may be desirable to include only one measurement client 106 or one measurement server 108.

Continuing with the example of FIG. 1, PON network path includes a subscriber router 116 connected or coupled to an optical network terminal (ONT) 118 (both may be incorporated into an integrated device). ONT 118 is connected or coupled to a PON network 120 that is connected or coupled to an optical line terminal (OLT) 122. OLT 122 is connected or coupled to an Access Aggregation Router (AAR) 124. OLT 122 and/or AAR 124 are located at a headend to provide services, including internet and cloud services, to CPE such as ONT 118 and client devices 101 connected or coupled to router 116 over PON network 120. AAR 124 is connected or coupled to hub router 111. As described above client devices 101 can also include a measurement client 106 and/or a measurement server 108 to provide from additional measurements.

For this example, hub router 111 is connected or coupled to metro network 126 which is connected or coupled to service provider backbone network 128. The internet 130 is connected or coupled to service provider backbone network 128. While controller 102 and database 110 are shown as being included with service provider backbone network 128, additional controllers and databases can be included in different locations, such as the internet for example. For example, controller 102 can be included as part of a network device or server machine in the internet 130 or other network or combination of networks. As described herein, a network can include a plurality of different network types spanning large areas and premises. A service provider, such as an ISP for example, utilizes various delivery equipment to provide video, internet, telephony, and/or other services to end-users. For example, a service provider can utilize a headend location to provide internet, live video, video conferencing, and other services to customers or subscribers (e.g., residential, business, etc.) via one or more network nodes that serve multiple customers or subscribers.

According to one implementation example, measurement clients 106 and/or measurement servers 108 are included with Layer 3 type networking devices. For example, gateway 112 can include a measurement client 106 and a measurement server 108, while a user laptop can include a measurement client 106 to perform upstream network measurements. Subscriber router 116 can also include a measurement client 106 and/or a measurement server 108, as well as CCAP 114 and AAR 124.

Measurement clients 106 and/or measurement servers 108 can also be distributed with Layer 3 devices of metro network 126, service provider backbone network 128, and/or internet 130. For this example, an additional Layer 3 device 132, such as a network switch for example, that also includes a measurement client 106 and/or a measurement server 108 has been connected or coupled with hub router 111 to provide as an additional measurement location in the network topology. As described further below, controller 120 can instruct one or more measurement clients 106 to perform network measurements with one or more measurement servers 108 to identify unacceptable network conditions, including sources of lag, such as unacceptable amounts of jitter, latency, and/or packet loss for example.

As one example, multiple measurement points can be used to identify and mitigate unsatisfactory network conditions including two measurement clients A (e.g., consumer device 101) and B (e.g., gateway 112) and two measurement servers C (e.g., gateway 112) and an endpoint D (e.g., device 132 coupled to hub router 111) to perform a detailed and complex analysis of the network segment. For this example, the network segment represents a network portion or route from measurement client A to measurement server D. In general, there can any number of arbitrarily arranged measurement clients and measurement servers located between measurement client A and measurement server D and there is no requirement to alternate measurement clients and servers. Each measurement client A, B can be controlled to perform measurement tests with one or more upstream measurement servers, where upstream may be defined as the direction toward a wide area network or the internet 130 for example.

In one implementation example, each measurement client A, B has Layer 3 network connectivity to controller 102 to establish a secure command and control connection. Each measurement client A, B can be configured to detect sources of lag by performing round trip measurements for example against all or some subset of upstream measurement servers, such as measurement client A to measurement server C, measurement client A to measurement server D, and measurement client B to measurement server D. Accordingly, one or more sources of lag associated with each portion of the network segment can be detected and mitigated by controller 102. Sources of lag can be stored in database 110 and machine learning can be used to identify best mitigation processes according to each source of lag type.

Figure 2:
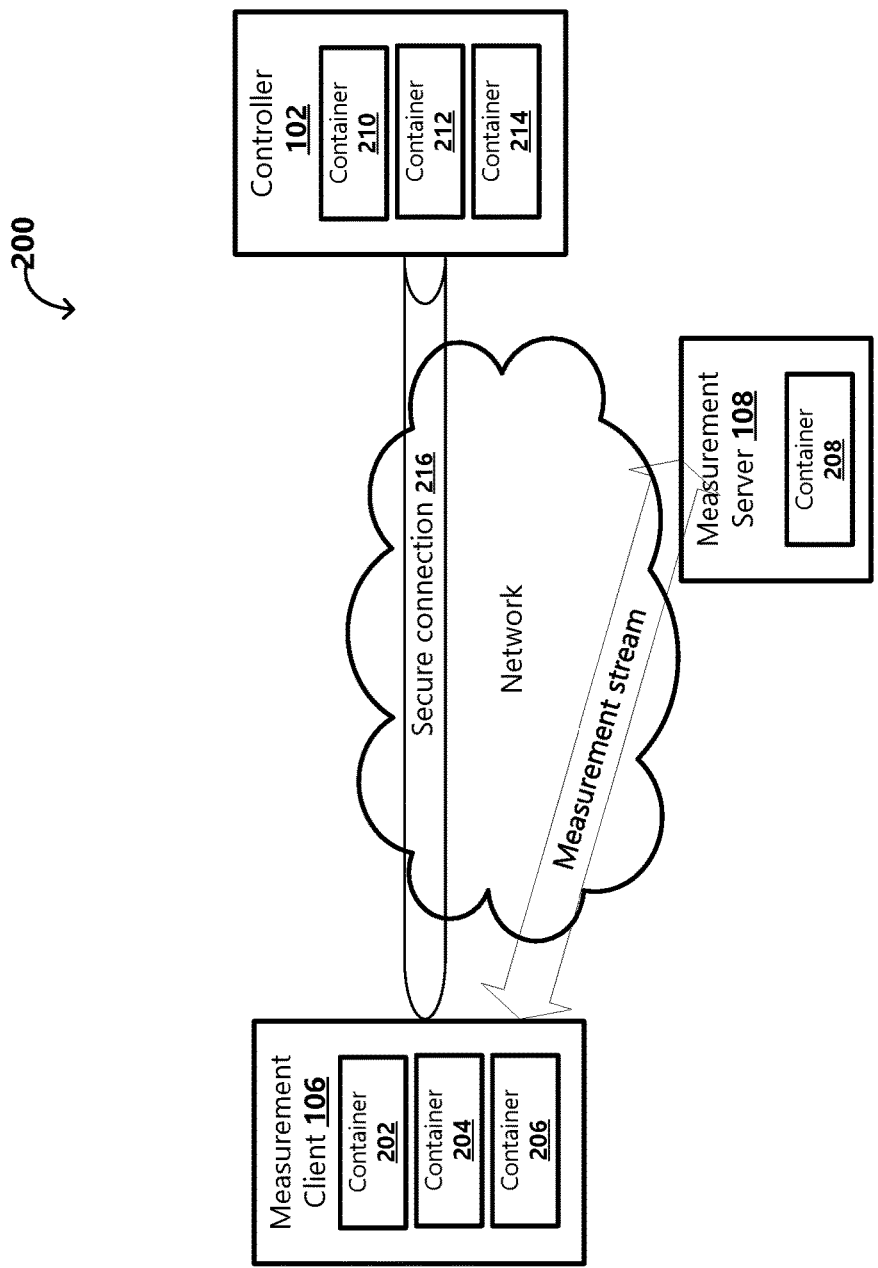
FIG. 2 is a block diagram of an implementation example of a system that includes at least one measurement client and at least one measurement server according to an aspect.

FIG. 2 is a block diagram of an implementation example of a system 200 that includes at least one measurement client 106 and at least one measurement server 108. According to an aspect, measurement server 108 can optionally establish a secure connection to controller 102 to receive configuration parameters. Alternatively, measurement server 108 can use hardcoded parameters. For the example of FIG. 2, software containers are utilized to enable measurement client 106, measurement server 108, and controller 102 to perform various processes or functions. According to one aspect, a first container 202 associated with measurement client 106 can be configured to register with one or more controllers 102, perform network testing that includes round trip network measurement tests and/or performance measurement tests, collect measurement results such as tracking packets sent and received for example, and/or forward measurement results to a controller 102 that instructed the measurement client 106 to perform network measurements.

According to an aspect, the first container 202 includes processes to use measurement results to calculate an amount of latency (e.g., round trip time for a packet to travel from a measurement client 106 to a measurement server 108 and back to the measurement client 106), an amount of packet loss (e.g., sent 500 packets but only 497 returned from a measurement server 108), and/or an amount of jitter (e.g., sent packets 50 milliseconds (ms) apart, but received from a measurement server 108 47 ms apart, then 52 ms apart, 49 ms apart, etc.). A second container 204 associated with measurement client 106 can be configured to establish a secure connection (e.g., virtual private network (VPN)) with controller 120. A third container 206 associated with measurement client 106 can be configured to provide a lightweight, publish-subscribe, network protocol for message broker services to control the measurement stream. Measurement server 108 includes a container 208 configured to operate as a round trip tracking or performance tracking server. For example, container 208 includes a process that operates to receive measurement streams from one or more measurement clients, add timestamps to stream packets, and return or reflect each measurement stream to a corresponding measurement client 106. Measurement servers can be deployed with virtual machines and/or with other container platforms.

As shown in FIG. 2, controller 102 includes a first container 210 configured to: receive registration messages from measurement clients and/or measurement servers; instruct and manage measurement clients and/or measurement servers to perform measurement tests including which measurement client(s) and/or measurement server(s) to use for a measurement test; types of packet streams; measurement duration(s); types of measurement tests; collect and aggregate, measurement results; compare measurement results to baselines or unacceptable thresholds; calculate minimums, maximums, means, and standard deviations for round trip time measurements, jitter measurements, latency measurements, packet loss measurements, etc.; provide or implement mitigation processes; etc. As an example, controller 102 has determined that a measurement client 106 utilized a measurement stream having a UDP payload size of 172 bytes, an inter-packet interval of 20 ms, and performed measurements for 30 seconds. The total bandwidth was 67.5 Kbps, approximating a UDP audio stream. The round-trip time was on average 84.55 ms with an average jitter of 2.32 ms.

Controller 102 includes a second container 212 configured to establish secure connections with measurement clients and a third container 214 configured to provide a lightweight, publish-subscribe (e.g., broker and local host client), network protocol for message broker services that enables controller 102 to establish one to one communication with particular measurement clients 106 and also to send messages to multiple measurement clients 106 simultaneously.

As shown in FIG. 2, a secure connection channel 216 (e.g., VPN where each peer has a unique Private Key and a statically assigned IP address in the VPN subnet via a dynamic VPN credential process) has been established between measurement client 106 and controller 102. Using secure connection channel 216, controller 102 can asynchronously initiate tests to selected measurement clients 106 at will. In one aspect embodiment, Transport Layer Security (TLS) can be used to provide privacy and authentication for measurement clients 106 and controller 102. While certain containers having certain functionality are described, it will be appreciated that additional containers can be added to provide additional features.

Figure 3:
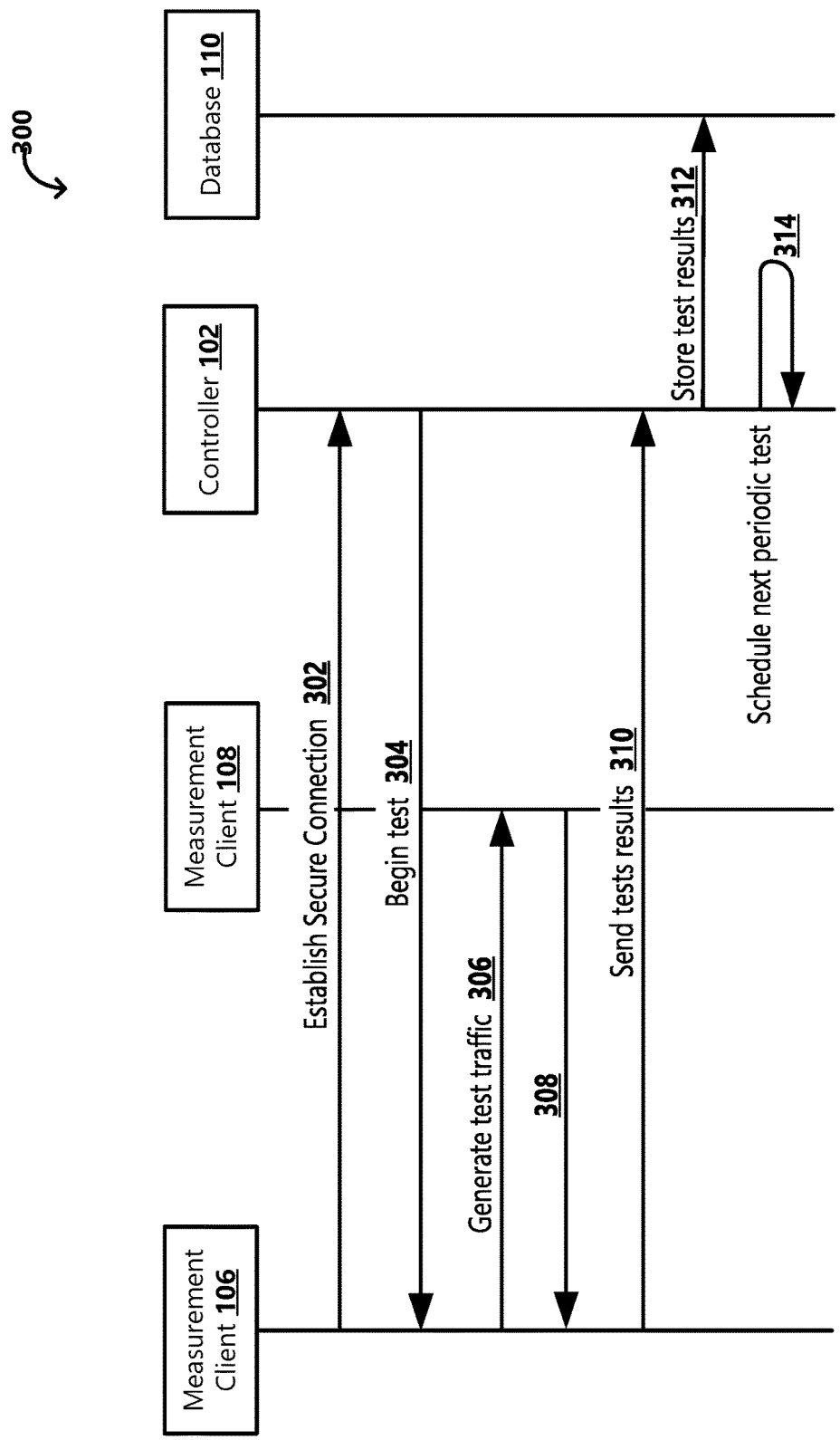
FIG. 3 is a communication diagram of an exemplary network monitoring process according to an aspect.

FIG. 3 is a communication diagram of an exemplary network monitoring process 300. According to an aspect, monitoring process 300 can be configured to periodically (e.g., daily, hourly, etc.) measure an amount of latency, an amount of jitter, and/or an amount of packet loss at specified locations of a network topology. For example, monitoring process 300 can be used to monitor one or more network devices to identify sources of lag at each node of an ISP network. At 302, a measurement client 106 establishes a secure connection, such as a network VPN tunnel for example, with controller 102 by sending a registration message to indicate that it is available for providing measurement data at its network location. For example, the registration message can include information about a current location of measurement client 106 in the network topology (e.g., public Internet protocol (IP) v4 and IPV6 addresses).

At 304, controller 102 instructs, over the secure channel, measurement client 106 to initiate a measurement test with a measurement server 108 to identify network conditions at the network location of measurement client 106 including the network path therebetween. At 306, measurement client 106 initiates the measurement test to output measurement results which can be used to determine an amount of latency, an amount of jitter, and/or an amount of packet loss associated with its network location. According to an aspect, measurement client 106 sends a test or measurement stream of packets (e.g., UDP packets) to the measurement server 108 identified by controller 102.

At 308, after receiving the measurement stream, measurement server 108 returns the measurement stream of packets to measurement client 106. At 310, after receiving the measurement stream from measurement server 108, measurement client 106 sends measurement results associated with the measurement test to controller 102. At 312, controller 102 stores the measurement results in database 110 along with identification information that identifies each of the measurement client 106 and measurement server 108.

In some aspects, measurement client 106, controller 102, or another component can be configured to use the measurement results (e.g., round trip results) to determine an amount of latency, an amount of jitter, and/or an amount of packet loss at the network location or along the network path between the measurement client 106 and measurement server 108. For example, an amount of latency can be determined by an amount of time for a packet to make a round trip, an amount of jitter can be determined by a time variation associated with the time between packets being sent and the time between packets being received, and/or an amount of packet loss can be determined by comparing the number of packets sent and the number of packets received.

Depending on whether the measurement results correspond with unacceptable amounts of latency, jitter, and/or packet loss, controller 102 can be configured to initiate a variety of mitigation operations. For example, if an amount of packet loss exceeds a packet loss threshold, if an amount of latency exceeds a latency threshold, and/or if an amount of jitter exceeds a jitter threshold, controller 102 can be configured to isolate an associated network device to prevent further issues, adjust operational parameters or a configuration of an associated network device, provide a communication (e.g., automated call, text, page, etc.) to a technician's device with the measurement results, location of the issue, and/or instructions on steps to mitigate or ascertain a cause of the packet loss, etc. At 314, controller 102 can be configured to instruct measurement client 106 to initiate one or more additional measurement tests or to run a measurement test at some later time. Depending on scale and the network architecture, multiple measurement servers 108 measurement clients 106, controllers 102, and/or databases 108 can be distributed throughout to perform various types of measurement tests with various combinations and timing of measurements.

Figure 4:
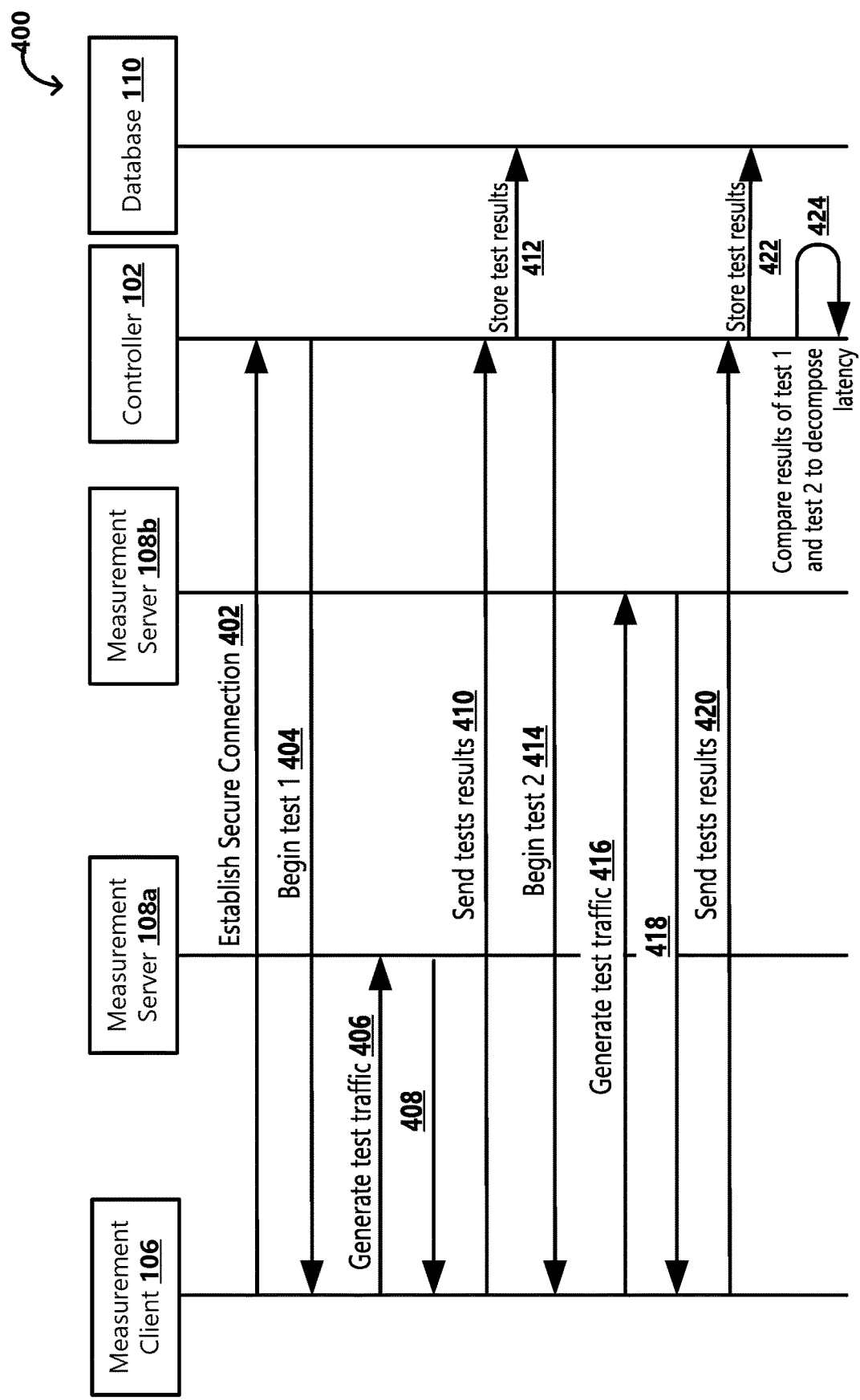
FIG. 4 is a communication diagram of an exemplary network path monitoring process according to an aspect.

FIG. 4 is a communication diagram of an exemplary network path monitoring process 400. According to an aspect, network path monitoring process 400 can be executed to provide a detailed analysis of a network segment. For example, controller 102 can initiate the network path monitoring process 400 to identify sources of lag and/or mitigate unacceptable network conditions in response to a customer complaint or an automated detection of inadequate network performance, a service outage, etc. The network path monitoring process 400 can be used to determine one or more sources of lag along a network path or segment of a network topology including identifying amounts of latency, jitter, and/or packet loss.

At 402, a measurement client 106 establishes a secure connection, such as a VPN tunnel for example, with controller 102 by sending a registration message as part of performing a detailed analysis of a network segment from measurement client 106 to some other network location. For example, the registration message can include information about a current location of the particular measurement client 106 in the network topology (e.g., public Internet protocol (IP) v4 and IPV6 addresses) and/or a location of a defined endpoint location.

Process 400 utilizes multiple measurement servers deployed along a network segment to provide corresponding measurement results associated with measurement tests with the multiple measurement servers. For the example of FIG. 4, controller 102 can query database 110 or using trace routing to identify measurement servers 108*a* and 108*b* along the network segment to be used for measurement tests to identify one or more sources of lag or unsatisfactory performance issues along the network segment.

For example, measurement client 106 can be provided with a customer laptop, measurement server 108*a* can be provided with gateway 112, and measurement server 108*b* can be provided with CCAP or CMTS 114 as an endpoint of the network segment. As another example, a first measurement client can be provided with a customer laptop, a second measurement client can be provided with gateway 112, and a measurement server 108 can be provided with CCAP or CMTS 114 to deconstruct portions of the network segment differently.

Accordingly, process 400 is able to deconstruct the network segment and identify one or more sources of lag by performing a measurement test between customer laptop (first portion) and gateway 112 and performing a measurement test between customer laptop and CMTS 114 (second portion), or performing a measurement test between customer laptop and CMTS 114 (second portion) and between gateway 112 and CMTS 114 (third portion) to quantify network conditions along different portions of the network segment. Measurement clients 106 can also be provided with each of the measurement servers 108*a* and 108*b* to provide additional measurement granularity and testing configurations over the network segment.

At 404, controller 102 instructs, over the secure channel, measurement client 106 to initiate a measurement test with measurement server 108*a*. At 406, measurement client 106 initiates the measurement test using a measurement stream with measurement server 108*a* to output measurement results associated with a first portion of the network segment. For example, the measurement results associated with the first portion can be used to determine an amount of latency, an amount of jitter, and/or an amount of packet loss associated with the first portion. According to an aspect, measurement client 106 sends a test or measurement stream of packets (e.g., UDP packets) as the measurement stream to measurement server 108*a* to initiate the measurement test with measurement server 108*a*.

At 408, after receiving the measurement stream, measurement server 108*a* returns the measurement stream to measurement client 106. At 410, after receiving the measurement stream from measurement server 108*a*, measurement client 106 sends the measurement results to controller 102. At 412, controller 102 stores the measurement results in database 110 along with identification information that identifies each of the measurement client 106 and measurement server 108*a*.

At 414, controller 102 instructs, over the secure channel, measurement client 106 to initiate a measurement test with measurement server 108*b*. At 416, measurement client 106 initiates a measurement test using a measurement stream with measurement server 108*b* to output measurement results associated with a second portion of the network segment. For example, the measurement results can be used to determine an amount of latency, an amount of jitter, and/or an amount of packet loss associated with the second portion. According to an aspect, measurement client 106 sends a test or measurement stream of packets (e.g., UDP packets) as the measurement stream to measurement server 108*b* to initiate the measurement test.

At 418, after receiving the measurement stream, measurement server 108*b* returns the measurement stream to measurement client 106. At 420, after receiving the measurement stream from measurement server 108*b*, measurement client 106 sends the measurement results to controller 102. At 422, controller 102 stores the measurement results in database 110 along with identification information that identifies each of the measurement client 106 and measurement server 108*b*. At 424, according to an aspect, controller 102 analyzes each of the measurement results to quantify network conditions of the first and second portions of the network segment.

For example, controller 102 can be configured to compare the measurement results to determine an amount of latency, an amount of jitter, and/or an amount of packet loss associated with each of the first and second portions of the network segment. For example, if the laptop to CMTS 114 latency is 100 ms, but the gateway 112 to CMTS latency is 10 ms, the controller 112 can determine that the user's home network is contributing 90 ms of latency into the network. According to an aspect, controller 102 can be configured to instruct measurement client 106 to perform sequential or simultaneous tests against each of measurement servers 108*a* and 108*b* over a certain amount of time or at certain intervals.

Depending on whether the measurement results correspond with unacceptable network conditions on one or more of the first and second portions of the network segment, controller 102 can be configured to initiate mitigation operations. For example, if an amount of packet loss exceeds a packet loss threshold for one of the portions, if an amount of latency exceeds a latency threshold for one of the portions, and/or if an amount of jitter exceeds a jitter threshold for one of the portions, controller 102 can be configured to isolate an associated network device to prevent further issues, adjust operational parameters or a configuration of an associated network device, provide a communication (e.g., automated call, text, page, etc.) to a technician's device with the measurement results, location of the issue, and/or instructions on steps to mitigate or ascertain a cause of a source of lag, etc.

Figure 5:
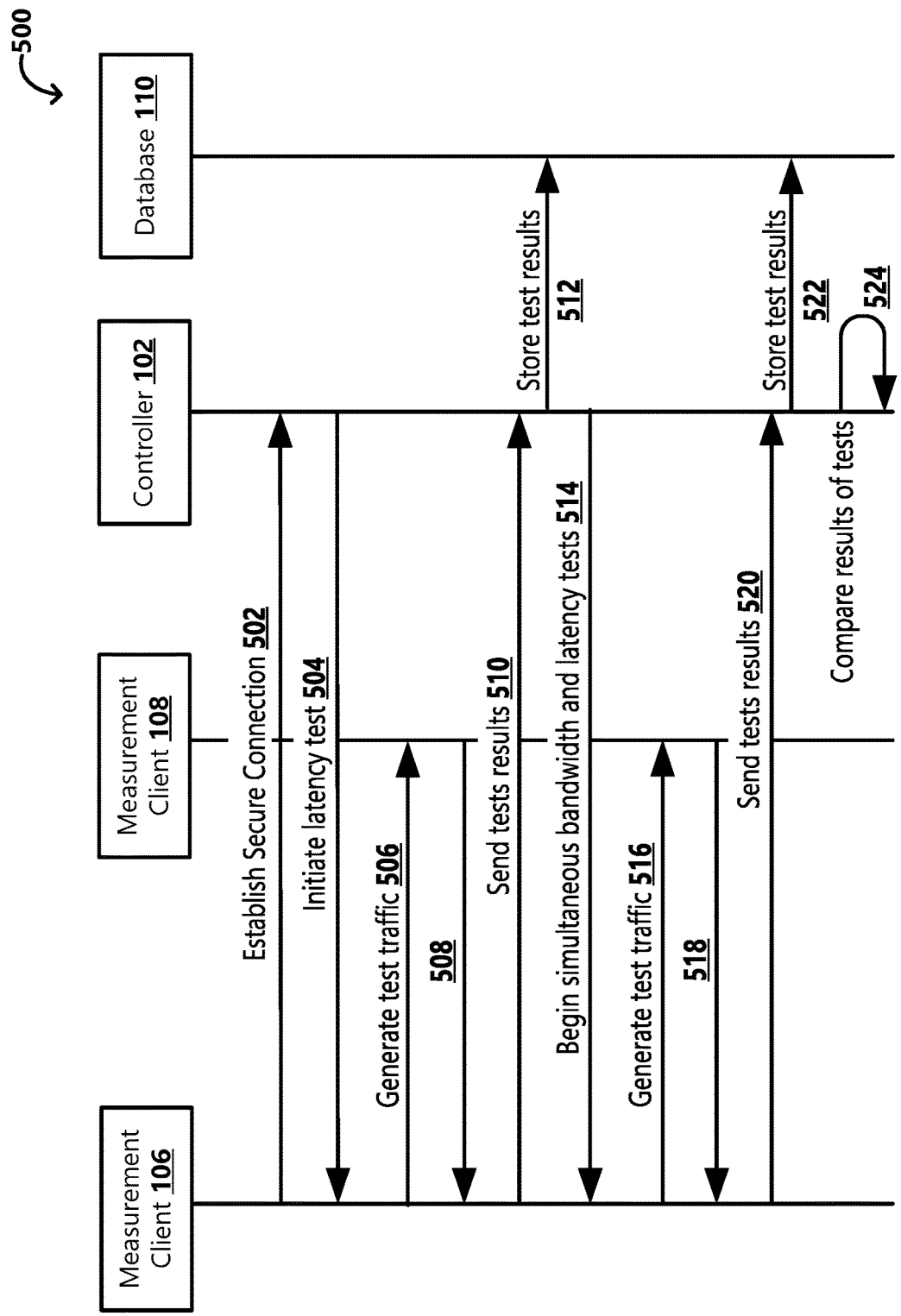
FIG. 5 is a communication diagram of an exemplary network buffer bloat measurement process according to an aspect.

FIG. 5 is a communication diagram of an exemplary network buffer bloat measurement process 500 for a network segment of a network. According to an aspect, buffer bloat measurement process 500 can be configured to detect latency spikes in a network when a device in the network performs an operation, such as uploading or downloading files for example, caused by excess buffering of packets. At 502, a measurement client 106 establishes a secure connection, such as a VPN tunnel for example, with controller 102 by sending a registration message to indicate that it is available for providing buffer bloat measurement data at its network location. For example, the registration message can include information about a current location of measurement client 106 in the network topology (e.g., public Internet protocol (IP) v4 and IPv6 addresses).

At 504, controller 102 instructs, over the secure channel, measurement client 106 to initiate a latency test with a particular measurement server 108 to measure an amount of latency at the network location of measurement client 106. At 506, measurement client 106 initiates the latency test to output measurement results which can be used to determine an amount of latency associated with its network location. According to an aspect, measurement client 106 sends a test or measurement stream of packets (e.g., UDP packets) to the measurement server 108 identified by controller 102.

At 508, after receiving the measurement stream, measurement server 108 returns the measurement stream of packets to measurement client 106. At 510, after receiving the measurement stream from measurement server 108, measurement client 106 sends measurement results associated with the latency test to controller 102. At 512, controller 102 stores the measurement results in database 110 along with identification information that identifies each of the measurement client 106 and measurement server 108.

At 514, controller 102 instructs, over the secure channel, measurement client 106 to initiate simultaneous bandwidth and latency tests with measurement server 108 to measure an amount of latency and available bandwidth at the network location of measurement client 106. At 516, measurement client 106 initiates the bandwidth and latency tests to output measurement results. According to an aspect, measurement client 106 sends a UDP packet stream over the network segment to measurement server 108 to measure latency while simultaneously saturating the network segment with a stream of Transmission Control Protocol (TCP) packets.

At 518, after receiving the two streams, measurement server 108 returns the two streams to measurement client 106. At 520, after receiving the two streams from measurement server 108, measurement client 106 sends measurement results to controller 102. At 522, controller 102 stores the measurement results in database 110 along with identification information that identifies each of the measurement client 106 and measurement server 108. At 524, according to an aspect, controller 102 measures the difference between the two latency measurements to determine if an increase in latency exceeds a threshold to quantify network conditions and determine if an unacceptable amount of latency is present in the network segment. For example, controller 102 can be configured to compare the measurement results to determine whether an amount of latency increased beyond a latency threshold in the presence of bulk data. If the amount of latency is greater than the latency threshold, controller 102 can determine that buffer bloat is present in the network segment and can initiate mitigation operations to correct the problem associated with the network segment.

Figure 6:
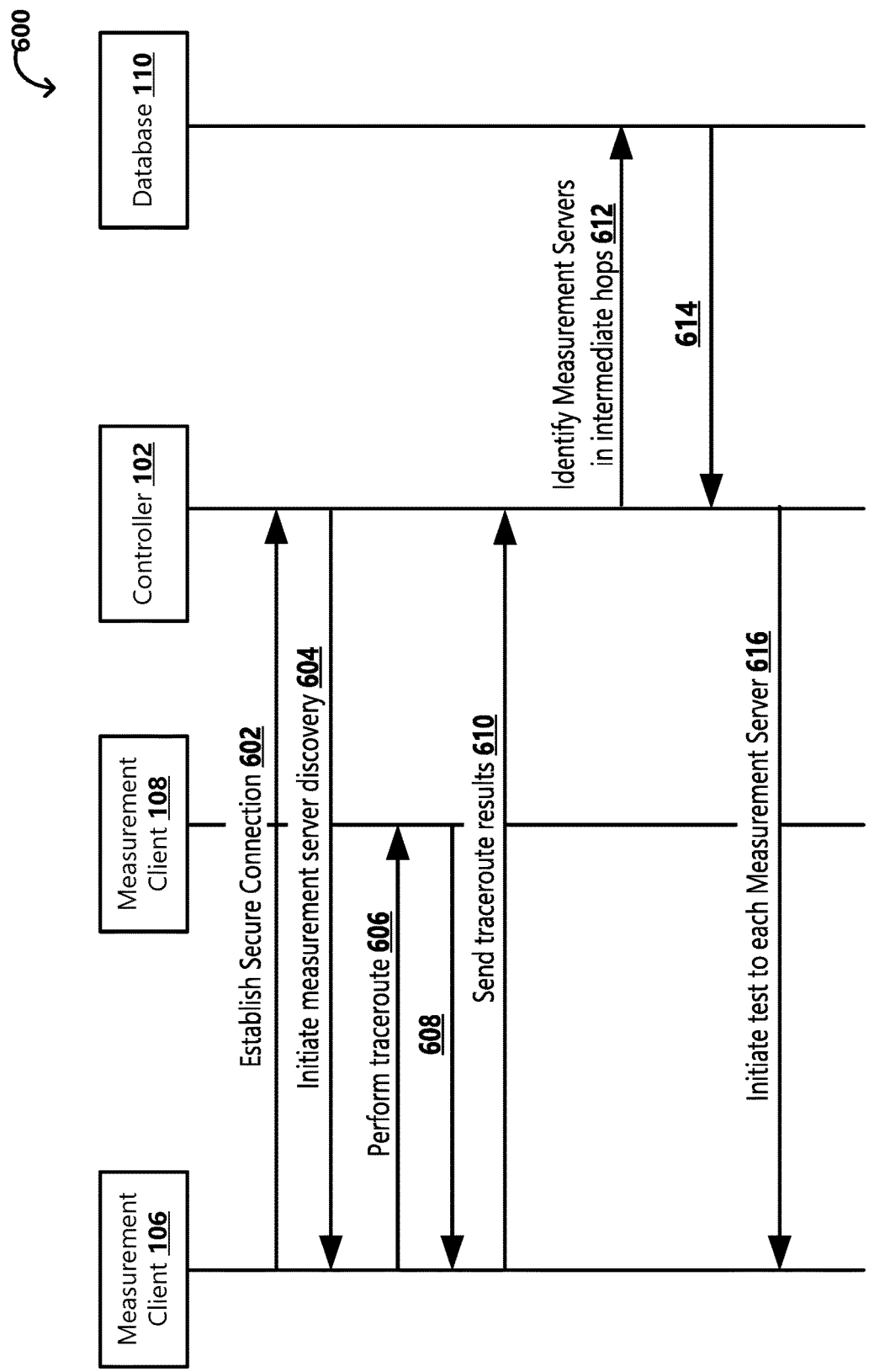
FIG. 6 is a communication diagram of an exemplary path-based measurement server discovery process according to an aspect.

FIG. 6 is a communication diagram of an exemplary path-based measurement server discovery process 600 used to locate and identify measurement servers distributed over a network topology. For example, the path-based measurement server discovery process 600 can be used to identify additional or previously unknown measurement servers located along a network segment, such as additional measurement servers located between measurement client 106 and a known measurement server located at a network endpoint or other network location.

At 602, a measurement client 106 establishes a secure connection, such as a VPN tunnel for example, with controller 102 by sending a registration message to indicate that it is available for locating measurement servers. For example, the registration message can include information about a current location of measurement client 106 in the network topology (e.g., public Internet protocol (IP) v4 and IPV6 addresses). At 604, controller 102 instructs, over the secure channel, measurement client 106 to initiate measurement server discovery operations.

At 606, measurement client 106 initiates measurement discovery operations by performing a command, such as a traceroute command for example, to identify one or measurement servers located along a network segment. At 608, output is provided from the traceroute command that enumerates hops, such as routers for example, between measurement client 106 and a known management server. Each hop can be identified by an IPV4 or IPV6 address. At 610, measurement client 106 sends results from the traceroute command to controller 102. At 612, controller 102 compares identified IP addresses to known measurement server IP addresses stored in database 110.

At 614, IP addresses of discovered measurement servers are returned to controller 102. At 616, controller 102 can instruct measurement client 106 to initiate a particular type of measurement with one or more discovered measurement servers according to the identified IP addresses, as described above. Once measurement servers are discovered, database 110 can be updated with information associated with the discovered measurement servers. For example, database 100 can be updated by manually populating database 110 with measurement servers that are managed virtual machines (VMs).

As another example, database 100 can be updated after discovering subscriber gateways, modems, or wireless routers that include measurement servers using protocols like Bonjour or Simple Service Discovery Protocol (SSDP) for example. As further example, database 100 can be updated when network devices having public IP addresses (e.g., network routers, CCAP or CMTS, AAR, backbone routers, etc.) establish a secure connection with controller 102 to register. For example, a measurement client 106 can be configured to register with controller 102 upon boot up by locating controller 102 using a Fully Qualified Domain Name (FQDN) for example. Alternately, the controller FQDN can be provisioned by Dynamic Host Configuration Protocol (DHCP), Simple Network Management Protocol (SNMP), TR-069 or other management protocols.

Figure 7:
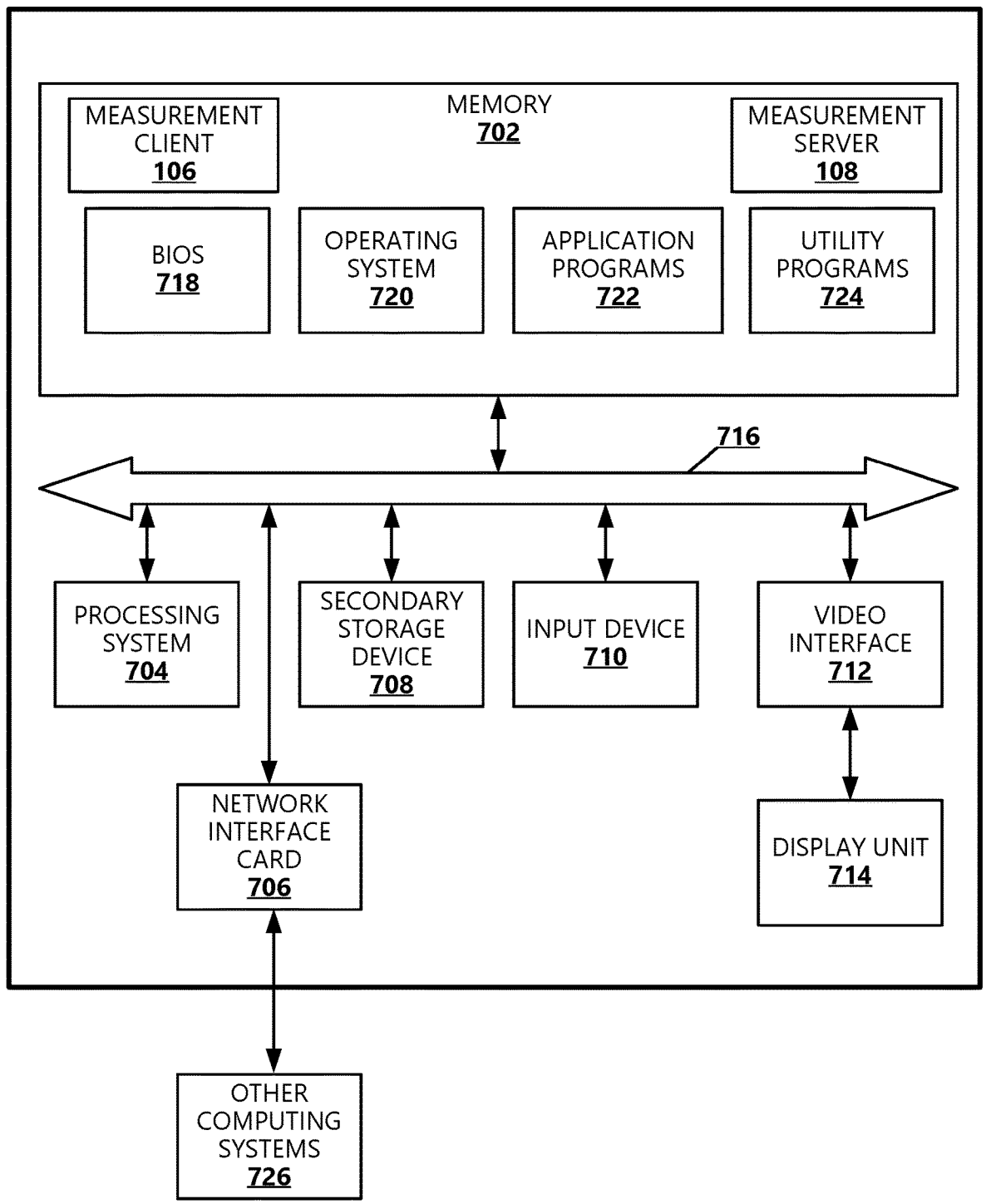
FIG. 7 is a block diagram illustrating example physical components of a computing device or system with which embodiments can be practiced.

FIG. 7 is a block diagram illustrating example physical components of a computing device 700 or system with which embodiments may be practiced as part of providing a platform for measurement clients, measurement servers, controllers, databases, etc. It should be appreciated that in other embodiments, different hardware components other than those illustrated in the example of FIG. 7 may be used. Computing devices may be implemented in different ways in different embodiments. For instance, in the example of FIG. 7, the computing device 700 includes a processing system 704, memory 702, a network interface card 706 (wired and/or wireless, cellular type, 802.11 type, etc.), a secondary storage device 708, an input device 710, a video interface 712, a display unit 714, and a communications medium 716. In other embodiments, the computing device 700 may be implemented using more or fewer hardware components (e.g., a video interface, a display unit, or an input device) or in combination with other types of computer systems and applications 726.

The memory 702 includes one or more computer-readable storage media capable of storing data and/or computer-executable instructions. Memory 702 may store the computer-executable instructions that, when executed by a processor of the processing system 704, control and manage network measurements. In various embodiments, the memory 702 is implemented in various ways. For example, the memory 702 can be implemented as various types of computer-readable storage media. Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices and/or articles of manufacture that store data.

The term computer-readable storage medium may also refer to devices or articles of manufacture that store data and/or computer-executable instructions readable by a computing device. The term computer-readable storage media encompasses volatile and nonvolatile, removable and non-removable media implemented in various methods or technologies for storage and retrieval of information. Such information can include data structures, applications, computer-executable instructions, or other data.

The processing system 704 includes one or more processing units, which may include tangible integrated circuits that selectively execute computer-executable instructions. In various embodiments, the processing units in the processing system 704 are implemented in various ways. For example, the processing units in the processing system 704 can be implemented as one or more processing cores. In this example, the processing system 704 can comprise one or more microprocessors. In another example, the processing system 704 can comprise one or more separate microprocessors. In yet another example embodiment, the processing system 704 can comprise Application-Specific Integrated Circuits (ASICs) that provide specific functionality. In yet another example, the processing system 704 provides specific functionality by using an ASIC and by executing computer-executable instructions.

The computing device 700 may be enabled to send data to and receive data from a communication network via a network interface card 706. In different embodiments, the network interface card 706 is implemented in different ways, such as an Ethernet interface, a token-ring network interface, a fiber optic network interface, a wireless network interface (e.g., cellular, WIFI, Wi-Max, etc.), or another type of network interface. The network interface may allow the device to communicate with other devices, such as over a wireless network in a distributed computing environment, a satellite link, a cellular link, and comparable mechanisms. Other devices may include computer device(s) that execute communication applications, storage servers, and comparable devices.

The secondary storage device 708 includes one or more computer-readable storage media, and may store data and computer-executable instructions not directly accessible by the processing system 704. That is, the processing system 704 performs an I/O operation to retrieve data and/or computer-executable instructions from the secondary storage device 708. In various embodiments, the secondary storage device 708 can be implemented as various types of computer-readable storage media, such as by one or more magnetic disks, magnetic tape drives, CD-ROM discs, DVD-ROM discs, BLU-RAY discs, solid state memory devices, and/or other types of computer-readable storage media.

The input device 710 enables the computing device 700 to receive input from a user. Example types of input devices include, but are not limited to, keyboards, mice, trackballs, stylus input devices, key pads, microphones, joysticks, touch-sensitive display screens, and other types of devices that provide user input to the computing device 700.

The video interface 712 outputs video information to the display unit 714. In different embodiments, the video interface 712 is implemented in different ways. For example, the video interface 712 is a video expansion card. In another example, the video interface 712 is integrated into a motherboard of the computing device 700. In various embodiments, the display unit 714 can be an LCD display panel, a touch-sensitive display panel, an LED screen, a projector, a cathode-ray tube display, or another type of display unit. In various embodiments, the video interface 712 communicates with the display unit 714 in various ways. For example, the video interface 712 can communicate with the display unit 714 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 716 facilitates communication among the hardware components of the computing device 700. In different embodiments, the communications medium 716 facilitates communication among different components of the computing device 700. For instance, in the example of FIG. 7, the communications medium 716 facilitates communication among the memory 702, the processing system 704, the network interface card 706, the secondary storage device 708, the input device 710, and the video interface 712. In different embodiments, the communications medium 716 is implemented in different ways, such as a PCI bus, a PCI Express bus, an accelerated graphics port (AGP) bus, an InfiniBand® interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 702 stores various types of data and/or software instructions. For instance, in the example of FIG. 7, the memory 702 stores a Basic Input/Output System (BIOS) 718, and an operating system 720. The BIOS 718 includes a set of software instructions that, when executed by the processing system 704, cause the computing device 700 to boot up. The operating system 720 includes a set of software instructions that, when executed by the processing system 704, cause the computing device 700 to provide an operating system that coordinates the activities and sharing of resources of the computing device 700. The memory 702 also stores one or more application programs 722 or program code that, when executed by the processing system 704, cause the computing device 700 to provide applications to users including network measurements to identify sources of lag. The memory 702 also stores one or more utility programs 724 that, when executed by the processing system 704, cause the computing device 700 to provide utilities to other software programs.

Embodiments may be used in combination with any number of computer systems, such as in server environments, desktop environments, laptop or notebook computer systems, multiprocessor systems, micro-processor based or programmable consumer electronics, networked PCs, mini computers, main frame computers and the like. Embodiments may be utilized in various distributed computing environments where tasks are performed by remote processing devices that are linked through a communications network in a distributed computing environment, and where program code may be located in local and/or remote memory storage (e.g., memory and/or disk(s)).

All system components described herein may be communicatively coupled via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), WAN technologies (T1, Frame Relay), Point-to-Point Protocol over Ethernet (PPOE), etc. including any combination thereof.

Aspects, for example, are described above with reference to block diagrams and/or operational illustrations of methods, systems, and computer program products according to embodiments. The functions/acts noted in the blocks can occur out of the order as shown in any flowchart or described herein. For example, two processes shown or described in succession can in fact be executed substantially concurrently or the blocks can sometimes be executed in the reverse order, depending upon the functionality/acts involved.

While certain embodiments have been described, other embodiments may exist. Furthermore, although embodiments have been described as being associated with data stored in memory and other storage mediums, data may also be stored on or read from other types of computer-readable storage media. Further, the disclosed processes may be modified in any manner, including by reordering and/or inserting or deleting a step or process, without departing from the embodiments.

The foregoing description has been presented for the purposes of illustration and description. It is not intended to be exhaustive or to limit the embodiments to the precise forms disclosed. Many modifications and variations are possible in light of the above teaching. It is intended that the scope of the invention be limited not with this detailed description, but rather by the claims appended hereto.

What is claimed is:

1. A method of detecting network conditions in a network comprising:
   identifying a plurality of distributed measurement points in a network, wherein identifying the plurality of measurement points comprises identifying:
      a measurement client configured to perform a network testing procedure with a measurement stream to determine network conditions; and
      a measurement server to configured to respond to the measurement stream received from the measurement client as part of the network testing procedure, wherein the measurement server is located upstream in the network from the measurement client;
   establishing a secure connection channel with the measurement client, wherein the secure connection channel comprises a unique private key and a statically assigned IP address for both the measurement client and the controller;
   determining a type of packet stream, a type of measurement test, and a measurement duration for the network testing procedure;
   issuing a command over the secure connection channel to the measurement client to begin network testing with the measurement server based on the types of packet stream and the measurement duration, wherein the measurement client sends the measurement stream comprising measurement stream packets to the measurement server in response to the command;
   receiving measurement results from the measurement client based on the measurement stream packets returned from the measurement server; and
   determining a source of lag in the network based on the measurement results.

2. The method of claim 1, further comprising instructing the measurement client to run tests against multiple measurement servers to determine a lag contribution at particular segments of the network.

3. The method of claim 2, wherein the lag contribution comprises at least one of an amount of jitter, an amount of latency, and an amount of packet loss from the network testing procedure comprising a round trip testing procedure or a performance testing procedure.

4. The method of claim 1, further comprising at least one of:
   measuring, using an Isochronous Round-Trip Tester (IRTT) client, a round trip time from the measurement client to the measurement server identified by the controller and back to the measurement client using a User Datagram Protocol (UDP) stream that includes UDP packets; and
   measuring, using a performance client, performance parameters from the measurement client to the measurement server identified by the controller and back to the measurement client using a Transmission Control Protocol (TCP) stream that includes TCP packets.

5. The method of claim 1, further comprising:
   performing a first network testing procedure with a first measurement client included with a first device and a first measurement server;
   performing a second network testing procedure with a second measurement client included with a second device in communication with the first device and the first server; and
   comparing results from the first network testing procedure and the second network testing procedure to determine a source of lag associated with one of the first device or the second device.

6. A non-transitory computer readable medium that includes executable instructions which, when executed detect network conditions in a network by:
   establishing a secure connection channel with a measurement client, wherein the measurement client is configured to perform a network testing procedure with a measurement stream to determine network conditions, and wherein the secure connection channel comprises a unique private key and a statically assigned IP address for both the measurement client and the controller;
   determining a type of packet stream, a type of measurement test, and measurement duration for the network testing procedure;
   identifying a measurement server to receive the measurement stream from the measurement client as part of the network testing procedure, wherein the measurement server is located upstream in the network from the measurement client;
   issuing a command over the secure connection channel to one or more of the plurality of measurement clients to begin network testing with at least one measurement server based on the types of packet stream and the measurement duration;

receiving, via the controller, measurement results from one or more of the plurality of measurement client based on the measurement stream packets returned from the measurement server; and determining, via the controller, a source of lag in the network based on the measurement results associated with one or more of the plurality of measurement clients.

7. A system to detect network conditions in a network comprising:
- a plurality of distributed measurement points, wherein the plurality of measurement points comprises:
  - a measurement client configured to perform a network testing procedure using a measurement stream to determine network conditions; and
  - a measurement server configured to receive the measurement stream from the measurement client as part of the network testing procedure, wherein the measurement server is located upstream in the network from the measurement client; and
- a controller configured to manage and control one or more of the plurality of distributed measurement points using a secure connection, wherein the controller is configured to:
  - establish a secure connection channel with the measurement client, wherein the secure connection channel comprises a unique private key and a statically assigned IP address for both the measurement client and the controller;
  - determine a type of packet stream, a type of measurement test, and a measurement duration for the network testing procedure;
  - issue a command to the measurement client over the secure connection channel to begin network testing with the measurement server, wherein the measurement client sends measurement stream packets based on the types of packet stream and the measurement duration to the measurement server in response to the command;
  - receive measurement results from the measurement client based on the measurement stream packets returned from the measurement server; and
  - determine a source of lag in the network based on the measurement results associated with one or more of the plurality of measurement clients.

8. The system of claim 7, wherein the controller is further configured to instruct the measurement client to run tests against multiple measurement servers to determine a lag contribution at particular segments of the network.

9. The system of claim 7, further comprising a first container associated with the measurement client and a second container associated with the measurement server, wherein the first container associated with the measurement client sends the measurement stream packets comprising User Datagram Protocol (UDP) packets to the measurement server and receive the UDP packets from the measurement server to determine the network conditions comprising an amount of lag associated with communications between the measurement client and the measurement server.

10. The system of claim 7, further configured to determine at least one of an amount of jitter, an amount of latency, and an amount of packet loss from the network testing procedure comprising a round trip testing procedure.

11. The system of claim 7, wherein each measurement point comprises a device in the network.

12. The system of claim 11, wherein the device includes a gateway, a router, a modem, a communication hub, a network switch, a personal device, or a server machine.

13. The system of claim 7, wherein the secure connection channel comprises a virtual private network (VPN) tunnel or a Transport Layer Security (TLS) connection.

14. The system of claim 7, wherein the measurement client implements an Isochronous Round-Trip Tester (IRTT) client to measure a round trip time from the measurement client to the measurement server and back to the measurement client using a User Datagram Protocol (UDP) stream that includes UDP packets.

15. The system of claim 7, wherein each measurement client implements a performance client to measure performance parameters from the measurement client to the measurement server and back to the measurement client using a Transmission Control Protocol (TCP) stream that includes TCP packets.

16. The system of claim 7, further comprising:
- a first measurement client included with a first device to perform a first network testing procedure with a first measurement server; and
- a second measurement client included with a second device in communication with the first device to perform a second network testing procedure with the first server, wherein the controller is configured compare results from the first network testing procedure and the second network testing procedure to determine a source of lag associated with one of the first device or the second device.

17. The system of claim 7, wherein the measurement server is located on a network switch or network hub.

18. The system of claim 7, further comprising a topology database coupled to the controller, wherein the topology database is used by the controller to determine which devices to include as part of a network test.

19. The system of claim 7, further comprising a topology database that maps a number of network paths that include multiple measurement servers and multiple measurement clients, wherein the controller uses the topology database to instruct one or more of the measurement clients to run the network testing procedure to determine lag parameters associated with one or more network paths.

20. The system of claim 7, wherein the controller refers to trace routing parameters from a routing trace procedure to identity the plurality of measurement points.

* * * * *